(12) United States Patent
He et al.

(10) Patent No.: US 7,079,359 B1
(45) Date of Patent: Jul. 18, 2006

(54) MAGNETIC RECORDING HEAD HAVING MODULES WITH OPPOSING READ ELEMENTS AND OPPOSING PERIODIC STRUCTURES

(75) Inventors: Jing He, Boulder, CO (US); Joseph M. Schmalhorst, Broomfield, CO (US); Carl A. Helms, Lafayette, CO (US); Edward V. Denison, Erie, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 11/209,119

(22) Filed: Aug. 22, 2005

Related U.S. Application Data

(62) Division of application No. 10/224,011, filed on Aug. 20, 2002, now Pat. No. 6,970,331.

(51) Int. Cl.
*G11B 5/33* (2006.01)
(52) U.S. Cl. ..................................... 360/314
(58) Field of Classification Search ................ 360/314, 360/316, 317, 121, 122; 29/603.12, 603.13
See application file for complete search history.

(56) References Cited

U.S. PATENT DOCUMENTS

| | | | |
|---|---|---|---|
| 5,216,363 A | | 6/1993 | Masaaki |
| 5,243,280 A | | 9/1993 | Kusumi |
| 5,331,493 A | * | 7/1994 | Schwarz ..................... 360/316 |
| 5,335,127 A | * | 8/1994 | Nagata et al. .............. 360/316 |
| 5,530,608 A | | 6/1996 | Aboaf et al. |
| 5,541,793 A | * | 7/1996 | Schwarz ..................... 360/121 |
| 5,694,677 A | * | 12/1997 | Tsunoda ................... 29/603.12 |
| 5,713,122 A | | 2/1998 | Aboaf et al. |
| 5,745,978 A | | 5/1998 | Aboaf et al. |
| 5,842,269 A | * | 12/1998 | Albertini et al. .......... 29/603.13 |
| 6,646,830 B1 | * | 11/2003 | Biskeborn et al. .......... 360/129 |
| 6,970,331 B1 | * | 11/2005 | He et al. ..................... 360/314 |

\* cited by examiner

*Primary Examiner*—Angel Castro
(74) *Attorney, Agent, or Firm*—Brooks Kushman P.C.

(57) ABSTRACT

A head includes first and second read modules. The first module has an MR element formed on a wafer having a grating directed along a first direction. The magnetization of the first module element is directed along the first direction. The first module element is biased with a first current directed along a direction such that magnetically stable operation of the element results, that is along an opposite second direction. The second module has an element formed on a wafer having a grating directed along the first direction. The second module is flipped respect to the first module such that the grating is directed along the second direction. The magnetization of the second module element is directed along the second direction. The second module element is biased with a second current directed along the direction opposite to the first current, i.e., the second current is directed along the first direction.

12 Claims, 7 Drawing Sheets

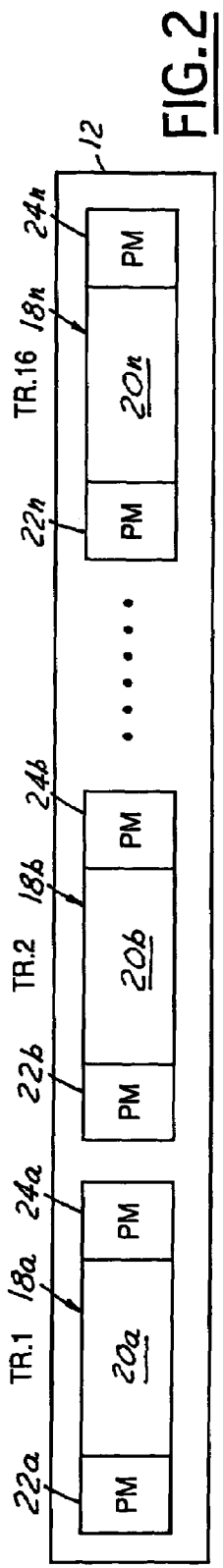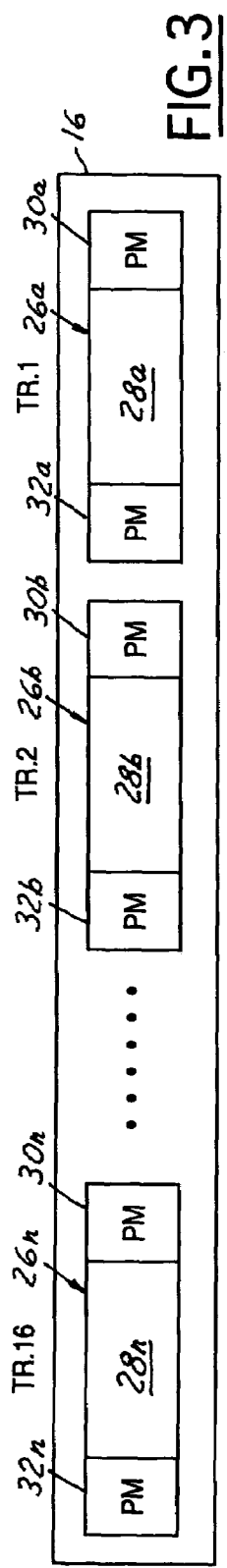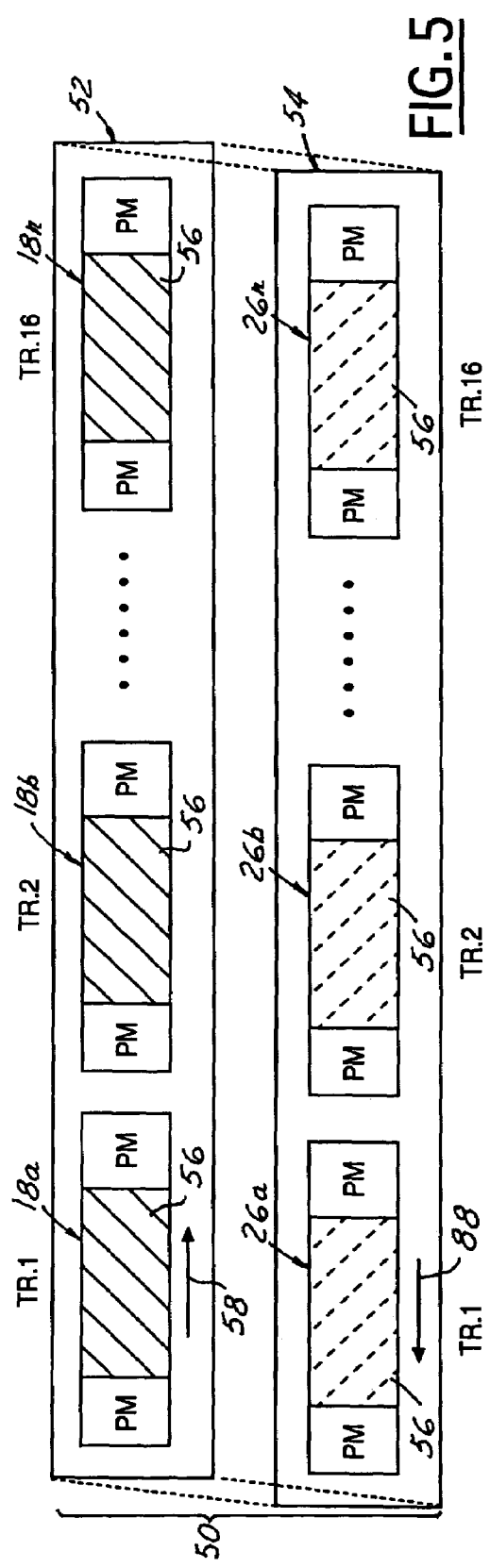

MAGNETIC RECORDING HEAD HAVING MODULES WITH OPPOSING READ ELEMENTS AND OPPOSING PERIODIC STRUCTURES

CROSS-REFERENCE TO RELATED APPLICATIONS

This is a divisional application of U.S. application Ser. No. 10/224,011, filed Aug. 20, 2002, now U.S. Pat. No. 6,970,331, which is hereby incorporated by reference.

BACKGROUND OF THE INVENTION

1. Field of the Invention

The present invention generally relates to magnetic recording media heads and, more particularly, to a magneto-resistive (MR) head having modules with opposing MR read elements and opposing periodic structures.

2. Background Art

Magnetic recording heads write and read data to and from magnetic recording media such as tape. The improvement in data densities on media is due in large part to improvements made in the sensor or transducer used for reading and writing data. An improvement in read sensor technology has been realized with the magneto-resistive (MR) sensor. The MR sensor detects magnetic field signals as resistance changes in a MR stripe or element.

MR heads employ multiple MR elements for reading data from respective tape tracks. MR heads may include two read modules for reading data from a tape in forward and backward tape directions. Each read module includes at least one MR read element. Each MR read element has an active central MR region abutted on each end by permanent magnet stabilization regions (i.e., permanent magnets). One read module (i.e., the read forward module) includes a MR read element for reading a tape track in the forward direction of the tape. Another read module (i.e., the read backward module) includes a MR read element for reading a tape track in the backward direction of the tape. Of course, each read module may include additional MR read elements for reading additional tape tracks such that the MR tape head becomes a multi-track MR tape head. The MR read elements are identified as either data or servo MR read elements depending on whether they read data or servo tape tracks.

In order for a MR head to function properly, each MR read element needs to be biased and magnetically stabilized in order to achieve high linearity and low Barkhausen noise levels. In the construction of MR heads using a periodic structure (i.e., grating) for magnetically stabilizing the MR read elements, two separate wafers are manufactured for the build of the two individual read module dies. That is, a first wafer for the read forward module and a second wafer for the read backward module are manufactured. The first and second wafers each have their own unique grating or periodic structure orientation (for example, 45°) complementing the MR read element abutted permanent magnet stabilization regions, the deposited easy axis orientation for the MR read element, and the bias current direction in each of the two read modules.

That is, the grating or periodic structure orientations of the two wafers are directed along respective opposite first and second directions. Thus, the grating or periodic orientation of the first wafer for the read forward module is directed along the first direction. The grating or periodic orientation of the second wafer for the read backward module is directed along the opposite second direction.

During assembly of a MR head, one of the read forward and backward modules is flipped over with respect to the other one of the read modules in order to be assembled into the MR head. For instance, the read backward module is flipped over with respect to the read forward module. Consequently, the grating or periodic structure orientations of the first and second wafers are now directed along the first direction when the read backward module is flipped over. Thus, the gratings of the wafers are mirror images in an assembled MR head.

At the completed head level with the read backward module flipped over, the direction of the PM magnetization is set along the first direction of the grating or periodic structure orientation of the two wafers. The bias current direction is set in each of the two modules along the first or second direction to magnetically stabilize the MR read elements.

As described above, prior to the read backward module being flipped over, the direction of the grating or periodic structure orientation of the first and second wafers of the read forward and backward modules is directed along opposite directions. Consequently, prior to the read backward module being flipped over, the PM magnetization and the bias current of the read forward module are directed along the first direction or second direction, i.e., along or anti-parallel to the grating or periodic structure orientation of the first wafer, while the PM magnetization and the bias current of the read backward module are directed opposite to their respective directions in the read forward module, i.e., along or anti-parallel to the grating or periodic structure orientation of the second wafer.

In effect, the first and second wafers each have their own unique grating or periodic structure orientation. As a result, two different wafer designs are required for use with this manufacturing technique.

This manufacturing technique allows the magnetic orientation of the MR read elements (data and servo) to be completed at the head level after all process destabilization effects have occurred. However, as described above, this manufacturing technique requires added cost for building two discrete wafers, the need for two wafer designs, and the related manufacturing line balance concerns.

What is needed is a MR head which is assembled by using a single wafer design for the read forward and backward modules. That is, what is needed is a common grating or periodic structure orientation wafer design for the two wafers used in fabricating the read forward and backward modules of a MR head. Such a common or single grating wafer design would eliminate the added costs associated with using two different wafer designs, and reduce production control costs. Such a common grating wafer design would result in the read modules having a common grating or periodic structure orientation prior to assembly into a MR head. Subsequently, when one of the read modules is flipped over for assembly into a MR head, the read modules of the MR head would have opposite grating or periodic structure orientations.

SUMMARY OF THE INVENTION

Accordingly, it is an object of the present invention to provide a magneto-resistive (MR) head having read modules formed with a common periodic structure (i.e., grating) orientation.

It is also an object of the present invention to provide a MR head having read modules with opposing MR read elements and opposing periodic structures when the read modules are assembled into the MR head.

It is another object of the present invention to provide a MR head having read modules with opposing MR read elements formed with a common periodic structure orientation to the permanent magnet stabilization regions abutting the MR read elements.

It is a further object of the present invention to provide a MR head having opposing MR read elements formed with a common periodic structure orientation to the deposited easy axis of the MR elements.

It is still another object of the present invention to provide a MR head having opposing MR elements in which the permanent magnet stabilization regions are magnetically set at head level by optimizing the direction and magnitude of bias current when using a common and opposite periodic structure orientation in the final MR head form.

It is still a further object of the present invention to provide a MR head having opposing MR read elements constructed from a common wafer design having a periodic stabilizing structure (i.e., grating) patterned in a complementary fashion to the easy axis MR deposition.

It is still yet another object of the present invention to provide a MR head having read forward and backward modules with opposing MR read elements in which each module is formed by using a single grating wafer design.

It is still yet a further object of the present invention to provide a MR head having opposing MR read elements biased appropriately such that the MR read elements may be fabricated by using a single grating wafer design.

Still, it is another object of the present invention to provide an assembled MR head having read forward and backward modules with opposing MR read elements in which the PM set direction of one of the read modules is substantially the same as the grating orientation and the PM set direction of the other one of the read modules is substantially opposite or anti-parallel to the grating orientation.

In carrying out the above objects and other objects, the present invention provides a magnetic head having first and second modules. The first module includes a magnetoresistive (MR) element formed on a wafer having a grating directed along a first direction. The MR element of the first module has magnetic end regions. The magnetization of the magnetic end regions of the MR element of the first module is directed along the first direction. The MR element of the first module is biased with a first bias current directed along a second direction opposite to first direction. The second module has a MR element formed on a wafer having a grating directed along the first direction. The MR element of the second module has magnetic end regions. The magnetization of the magnetic end regions of the MR element of the second module is directed along a second direction opposite to the first direction. The MR element of the second module is biased with a second bias current directed along the first direction. It is to be appreciated that if due to specific manufacturing details stable operation of the MR element of the first module is achieved by the first bias current being directed along the first direction rather than opposite to it as described above, the present invention is unchanged by then having the second bias current in the MR element of the second module directed opposite to the first direction. Thus, the second bias current in the second module is to be opposite or anti-parallel to the first bias current in the first module.

One of the first and second modules may be flipped over with respect to the other one of the first and second modules such that the direction of the grating of the wafer of the flipped over module is reversed with respect to the first direction.

The MR element of the first module may include a plurality of MR elements, and the MR element of the second module may include a plurality of MR elements. One of the first and second modules may be flipped over with respect to the other one of the first and second modules such that corresponding MR elements of the first module oppose corresponding MR elements of the second module.

The first module may be a read backward module, and the second module may be a read forward module. Conversely, the first module may be a read forward module, and the second module may be a read backward module. A write module may be disposed between the first and second modules.

BRIEF DESCRIPTION OF THE DRAWINGS

FIG. 2 illustrates a block diagram illustrating in greater detail the read backward module of the head shown in FIG. 1 viewed along the tape bearing surface;

FIG. 3 illustrates a block diagram illustrating in greater detail the read forward module of the head shown in FIG. 1 viewed along the tape bearing surface;

FIG. 5 illustrates a perspective side view of an assembled head in accordance with a first embodiment of the present invention;

DETAILED DESCRIPTION OF THE PREFERRED EMBODIMENT(S)

Figure 1:
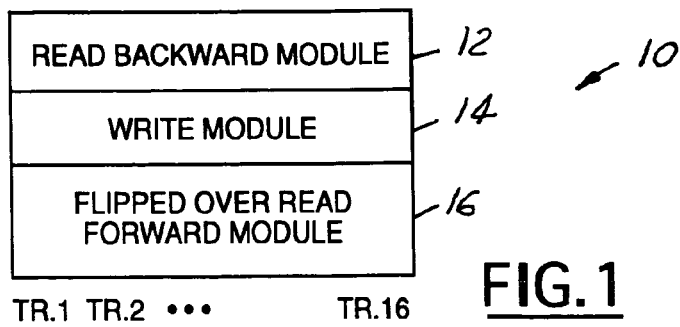
FIG. 1 illustrates a block diagram of an assembled magnetic recording head viewed along a tape bearing surface in accordance with the present invention.

Referring now to FIG. 1, a block diagram of an assembled magnetic recording head 10 in accordance with the present invention is shown. Head 10 includes a read backward module 12, a write module 14, and a read forward module 16. As such, head 10 has a three module configuration referred to as a r/w/r configuration. In general, read backward module 12 includes a magneto-resistive (MR) read element for reading a track of a recording media such as tape in the backward direction of the tape with respect to head 10. Write module 14 includes a write element for writing to a tape track in either direction of the tape with respect to head 10. Read forward module 16 includes a MR read element for reading a tape track in the forward direction of the tape with respect to head 10.

Read backward and forward modules 12 and 16 include multiple MR read elements for reading from multiple tape tracks. Write module 14 includes multiple write elements for writing to multiple tape tracks. For instance, read backward module 12 includes multiple MR read elements for reading multiple tape tracks in the backward direction of the tape. Each MR read element of read backward module 12 reads a respective tape track in the backward direction of the tape. Similarly, read forward module 16 includes multiple MR read elements for reading multiple tape tracks in the forward direction of the tape. Each MR read element of read forward module 16 reads a respective tape track in the forward direction of the tape.

For example, head 10 may be configured to read sixteen tape tracks at any one time. The sixteen tape tracks are labeled Tr. 1, Tr. 2 . . . . Tr. 16 in FIG. 1. In such a configuration, read backward and forward modules 12 and 16 each include sixteen MR read elements. Write module 14 includes sixteen write elements.

When read backward and forward modules 12 and 16 are assembled into head 10, the MR read elements of one of the read modules face or oppose the corresponding MR read elements of the other one of the read modules. For instance, the MR read elements of read forward module 16 oppose the MR read elements of read backward module 12. This is done by flipping over one of read backward and forward modules 12 and 16 with respect to each other. For example, as shown in FIG. 1, read forward module 16 is flipped over with respect to read backward module 12. As a result, the first MR-read element of read backward module 12 for reading the first tape track Tr. 1 in the backward tape direction faces or opposes the first MR read element of read forward module 16 for reading the first tape track Tr. 1 in the forward tape direction. Similarly, the last (i.e., sixteenth) MR read element of read backward module 12 for reading the sixteenth tape track Tr. 16 in the backward tape direction faces or opposes the last MR read element of read forward module 16 for reading the sixteenth tape track Tr. 16 in the forward tape direction.

Referring now to FIG. 2, a block diagram that illustrates in greater detail read backward module 12 of head 10 is shown. In keeping with the above-described example of head 10 configured to read from and write to sixteen tape tracks at any one time, read backward module 12 includes sixteen MR read elements 18*a*, 18*b*, . . . , 18*n*. Each MR read element 18 reads a respective tape track in the backward direction of the tape. For instance, MR read element 18*a* reads the first tape track Tr. 1 and MR read element 18*n* reads the sixteenth tape track Tr. 16 in the backward direction of the tape.

Each MR read element 18 includes a central active portion 20 abutted on each end by a pair of permanent magnets (PM) 22 and 24. Central active portion 20 of each MR read element 18 is the portion which actually reads the data from a tape track. Permanent magnets 22 and 24 of each MR read element 18 are used to stabilize central active portion 20 of the MR read element. Permanent magnets 22 and 24 of each MR read element 18 are separated from the permanent magnets of adjacent MR read elements by insulation or the like.

Referring now to FIG. 3, a block diagram illustrating in greater detail read forward module 16 of head 10 is shown. Read forward module 16 includes sixteen MR read elements 26*a*, 26*b*, . . . , 26*n*. Each MR read element 26 reads a respective tape track in the forward direction of the tape. For instance, MR read element 26*a* reads the first tape track Tr. 1 and MR read element 26*n* reads the sixteenth tape track Tr. 16 in the forward direction of the tape. Each MR read element 26 includes a central active portion 28 abutted on each end by a pair of permanent magnets (PM) 30 and 32.

Unlike FIG. 1, read forward module 16 is shown in FIG. 3 prior to being flipped over for assembly into head 10. As such, MR read elements 18 of read backward module 12 do not oppose corresponding MR read elements 26 of read forward module 16 when comparing FIGS. 2 and 3.

Figure 4A:
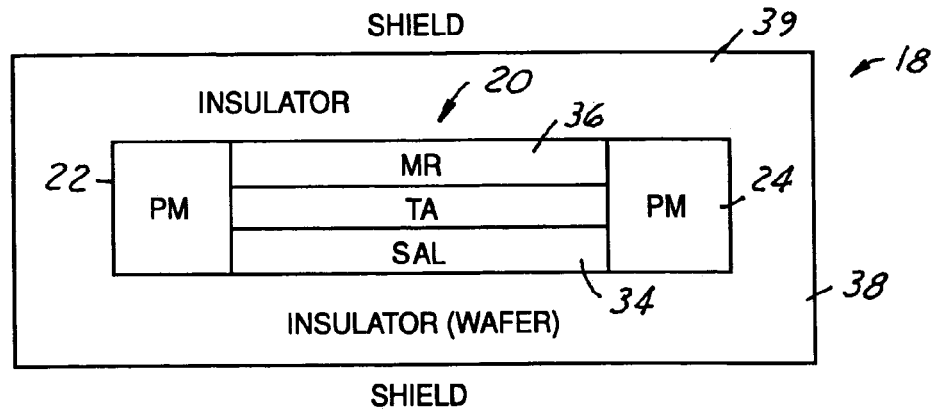
FIG. 4A illustrates a cross-sectional view of a MR read element of the read backward and forward modules of the head shown in FIG. 1 viewed along the tape bearing surface.

Referring now to FIG. 4A, a cross-sectional view of a MR read element such as MR read element 18 is shown. MR read element 26 has the same structure as shown in FIG. 4 and like elements have like reference numbers. Central active portion 20 includes an underlying soft adjacent layer (SAL) 34 separated by a non-magnetic layer such as tantalum (Ta) from a MR layer 36. An insulating wafer 38 lies underneath permanent magnets 22 and 24 and SAL 34 of MR read element 18. An insulator 39 lies above permanent magnets 22 and 24 and MR layer 36 of MR read element. Insulators 38 and 39 are bounded by respective shields.

Figure 4B:
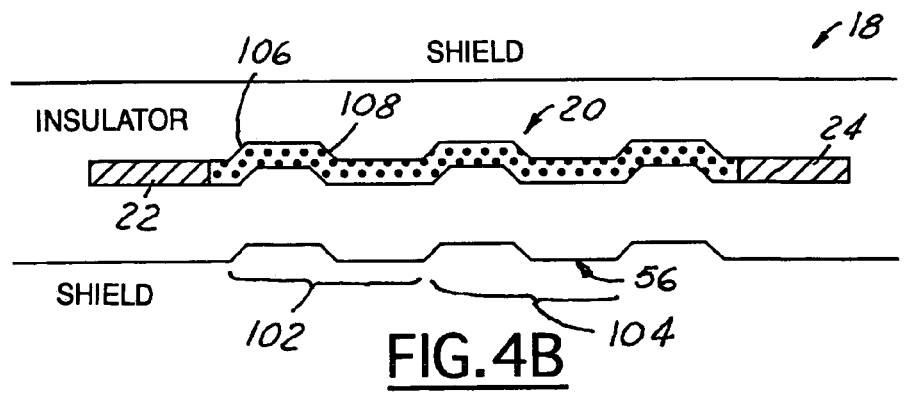
FIG. 4B illustrates a detailed cross-sectional view of a MR read element of the read backward and forward modules of the head shown in FIG. 1 having multiple gratings viewed along the tape bearing surface.
Figure 4C:
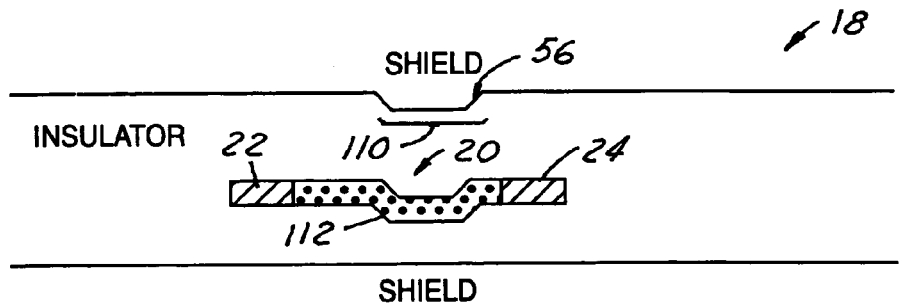
FIG. 4C illustrates a detailed cross-sectional view of a MR read element of the read backward and forward modules of the head shown in FIG. 1 having a single grating viewed along the tape bearing surface.

Referring now to FIGS. 4B and 4C, with continual reference to FIG. 4A, in accordance with the present invention, wafer 38 includes a grating 56 having a periodic structure orientation. As explained in greater detail below, grating 56 is used in conjunction with SAL 34 for configuring the magnetic orientation of MR layer 36, i.e., biasing the MR layer.

As shown in FIG. 4B, grating 56 includes a plurality of gratings such as gratings 102 and 104 which are positioned to cause central active portion 20 of MR read element 18 to have a series of step-like transitions. For each grating such as grating 102 central active portion 20 has two transitions such as transitions 106 and 108. In a preferred embodiment shown in FIG. 4C, grating 56 includes a single grating 110. As such, central active portion 20 has two transitions like 112. Only using a single grating 110 or a half grating (i.e., having only one transition of central active portion 20) in the MR region assists in stabilizing the assembled magnetic head when using grating 56 in conjunction with permanent magnets 22 and 24 and with SAL 34 for biasing MR layer 36 in accordance with the present invention.

Referring now to FIG. 5, a perspective side view of an assembled head 50 in accordance with a first embodiment of the present invention is shown. Head 50 includes a read backward module 52 and a flipped over read forward module 54. Head 50 includes a write module (not shown) disposed between read backward module 52 and read forward module 54. Read backward module 52 includes MR read elements 18a, 18b, and 18n for reading respective tape tracks Tr. 1 through Tr. 16. Read forward module 54 includes MR read elements 26a, 26b, and 26n for reading respective tape tracks Tr. 1 through Tr. 16. MR layers 36 of MR read elements 18 and 26 face each other and are closer to the write module than SAL 34 of the MR read elements 18 and 26.

As read backward module 52 is not flipped over, MR read elements 18 of the read backward module are shown in FIG. 5 looking through the substrate of head 50 such that MR layers 36 are represented as on the top surface. As read forward module 54 is flipped over with respect to read backward module 52, MR read elements 26 of the read forward module are shown in FIG. 5 looking through their closure such that MR layers 36 are represented as on the bottom surface.

Figure 6:
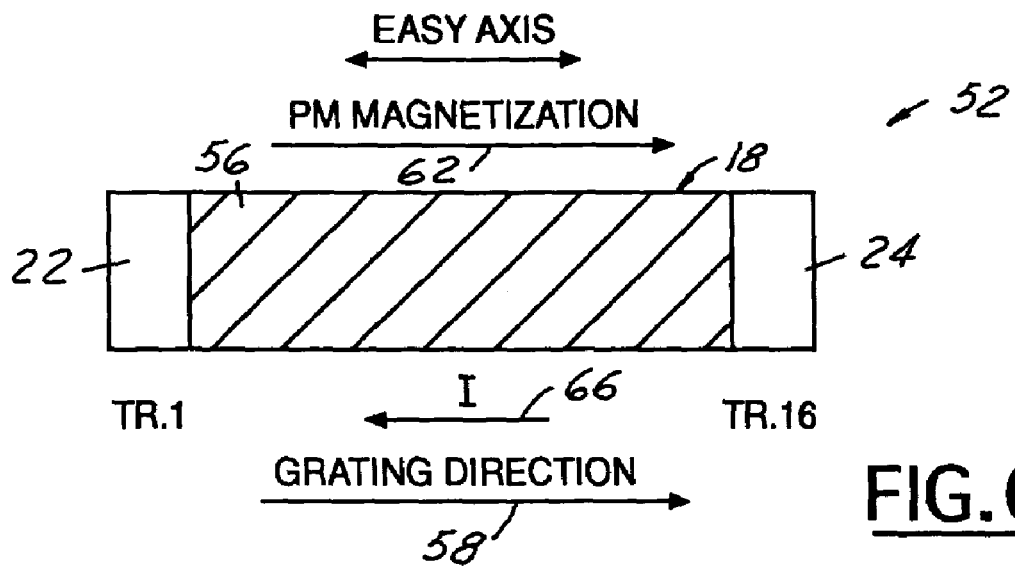
FIG. 6 illustrates a block diagram of a MR read element of the read backward module of the assembled head shown in FIG. 5 along a view with the MR layer on top and the SAL on bottom.
Figure 9:
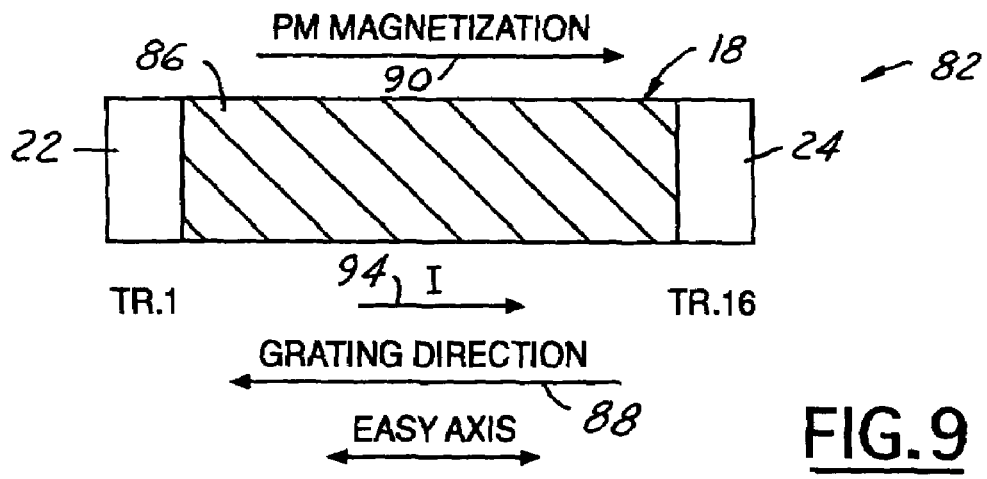
FIG. 9 illustrates a block diagram of a MR read element of the read backward module of the assembled head shown in FIG. 8 along a view with the MR layer on top and the SAL on bottom.

With reference to FIG. 4A, MR read elements 18 and 26 are formed over respective wafers 38. Each wafer 38 includes a grating 56 having a common periodic structure orientation such as 45°. The common periodic structure orientation is directed along a first direction 58 (as shown in FIG. 6). As read forward module 54 is flipped over in assembled head 50, grating 56 does not have a mirror image between read backward and forward modules 52 and 54 in the assembled head. That is in assembled head 50, grating 56 is directed along first direction 58 (as shown in FIG. 6) in read backward module 52 and is directed along a second opposite direction 88 (as shown in FIG. 9) in the flipped over read forward module 54. As such, grating 56 has an opposing periodic structure between read backward and forward modules 52 and 54 in assembled head 50.

Figure 7:
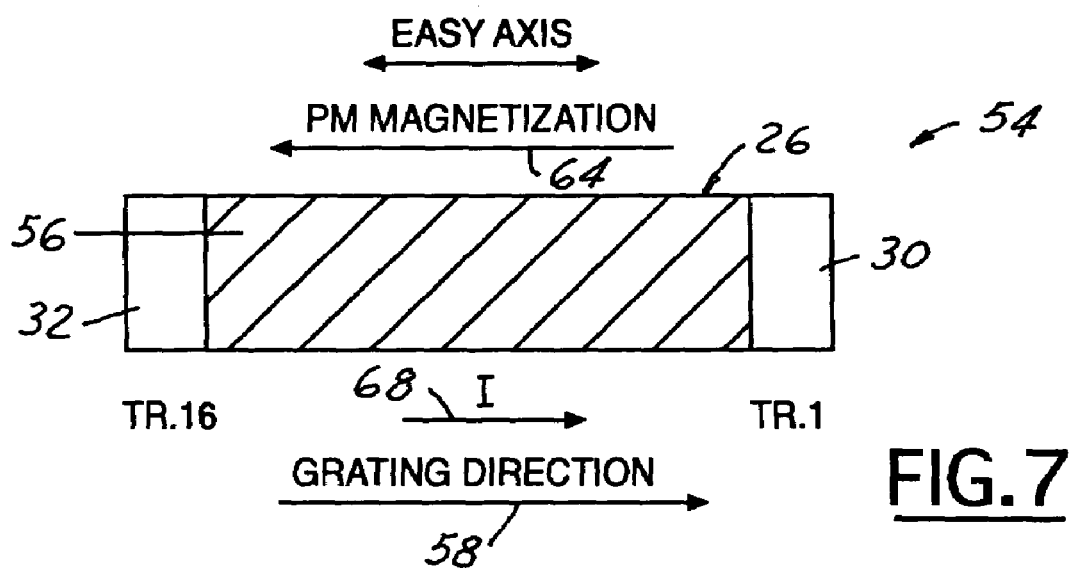
FIG. 7 illustrates a block diagram of a MR read element of the read forward module of the assembled head shown in FIG. 5 along a view with the MR layer on top and the SAL on bottom.

Referring now to FIGS. 6 and 7, the biasing of the MR read elements of read backward and forward modules 52 and 54 in accordance with a first embodiment of the present invention will now be described. FIG. 6 illustrates a block diagram of a MR read element 18 of read backward module 52 along a view with the MR layer on top and the SAL on bottom. FIG. 7 illustrates a block diagram of a MR read element 26 of read forward module 54 along a view with the MR layer on top and the SAL on bottom. As shown in FIG. 7, read forward module 54 has not yet been flipped over with respect to read backward module 52 for assembly into head 50. That is, FIG. 7 illustrates read forward module 54 prior to it being flipped over.

As grating 56 has a common periodic structure orientation, the orientation of the grating for MR read elements 18 and 26 is directed along first grating direction 58 as shown in FIGS. 6 and 7. Grating 56 has a common periodic structure orientation to the MR read element abutted permanent magnetization regions (i.e., permanent magnets) or to the deposited easy axis orientation of the MR layer of the MR read elements. By optimizing the direction and magnitude of the bias current, the completed MR read elements 18 and 26 with the permanent magnets may be magnetically set using a common and opposite periodic structure orientation in the final assembled head form. As such, the common grating design of wafer 38 eliminates the added cost of dual wafer design and reduces production control costs.

MR read elements 18 and 26 are constructed on common wafer 38 where the periodic structure orientation of grating 56 of the common wafer is patterned in a complementary fashion to the easy axis MR deposition. Read backward and forward modules 52 and 54 are assembled into head 50 such that the corresponding MR read elements 18 and 26 oppose one another. The permanent magnets are then magnetically set at the head level.

For instance, in read backward module 52, permanent magnets 22 and 24 of MR read elements 18 are set in a PM magnetization direction 62 the same as the orientation of grating 56 as shown in FIG. 6, i.e., PM magnetization direction 62 is the same as first grating direction 58. In read forward module 54, permanent magnets 30 and 32 of MR read elements 26 are set in a PM magnetization direction 64 opposite to the orientation of grating as shown in FIG. 7, i.e., PM magnetization direction 64 is opposite to first grating direction 58.

The bias current (I) for each of the MR read elements of read backward and forward modules 52 and 54 is then set in a direction that results in magnetically stable MR read element operation, that is, opposite to the respective PM magnetization directions 62 and 64 in this embodiment. For example, the bias current (I) for MR read elements 18 of read backward module 52 is set in a bias current direction 66 which is opposite to PM magnetization direction 62 as shown in FIG. 6, i.e., bias current direction 66 is opposite to first grating direction 58. The bias current (I) for MR read elements 26 of read forward module 54 is set in a bias current direction 68 opposite to PM magnetization direction 64 as shown in FIG. 7, i.e., bias current direction 68 is in the same direction as first grating direction 58.

In effect, the bias current (I) is opposite for read backward and forward modules 52 and 54 because the PM magnetization is opposite for the unassembled read backward and forward modules when the PM setting is done at the assembled head level. By biasing the MR read elements in this opposing current fashion, a single grating wafer design for opposing MR read elements in an assembled head is feasible.

Figure 8:
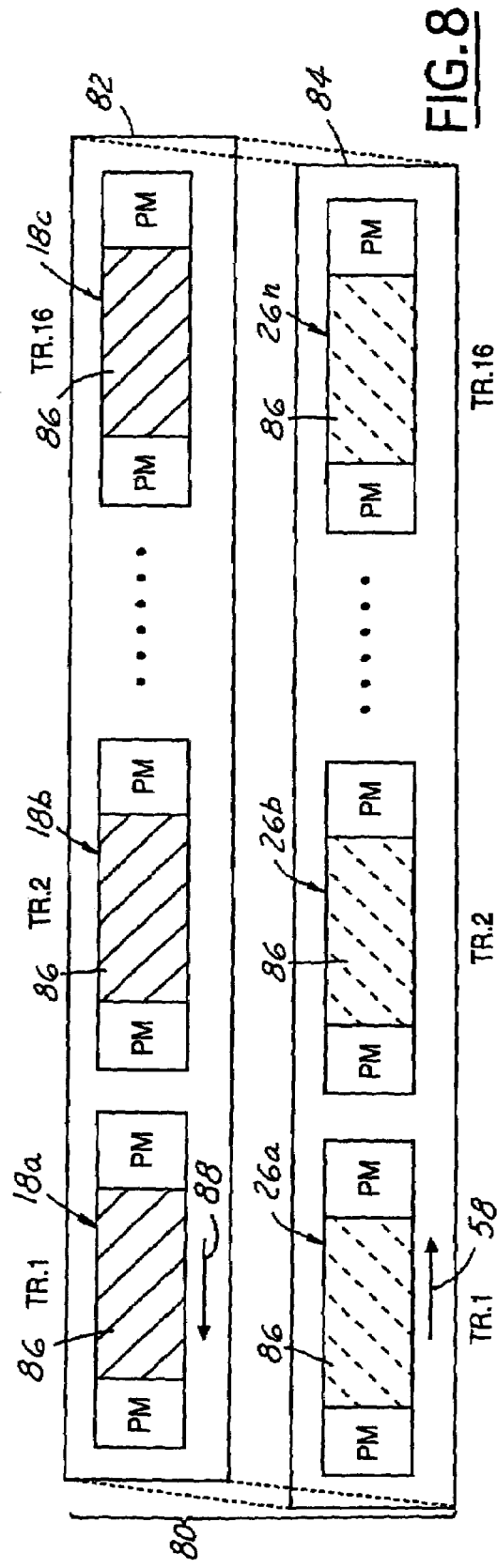
FIG. 8 illustrates a perspective side view of an assembled head in accordance with a second embodiment of the present invention.

Referring now to FIG. 8, a perspective side view of an assembled head 80 in accordance with a second embodiment of the present invention is shown. Head 80 includes a read backward module 82 and a flipped over read forward module 84. Head 80 includes a write module (not shown) disposed between read backward and forward modules 82 and 84. Read backward module 82 includes MR read elements 18a, 18b, and 18n for reading respective tape tracks Tr. 1 through Tr. 16. Read forward module 84 includes MR read elements 26a, 26b, and 26n for reading respective tape tracks Tr. 1 through Tr. 16. MR read elements 18 of read backward module 82 are shown in FIG. 8 looking through the substrate of head 80 such that MR layers 36 are represented as on the top surface. MR read elements 26 of read forward module 84 are shown in FIG. 5 looking through their closure such that MR layers 36 are represented as on the bottom surface.

Read backward and forward modules 82 and 84 are identical to read backward and forward modules 52 and 54 described with reference to FIGS. 5, 6, and 7, with the exception that the orientation of grating 86 of the common design of wafer 38 is reversed with respect to the orientation of grating 56. That is, the orientation of grating 86 is in a second grating direction 88 than first grating direction 58 of grating 56.

Figure 10:
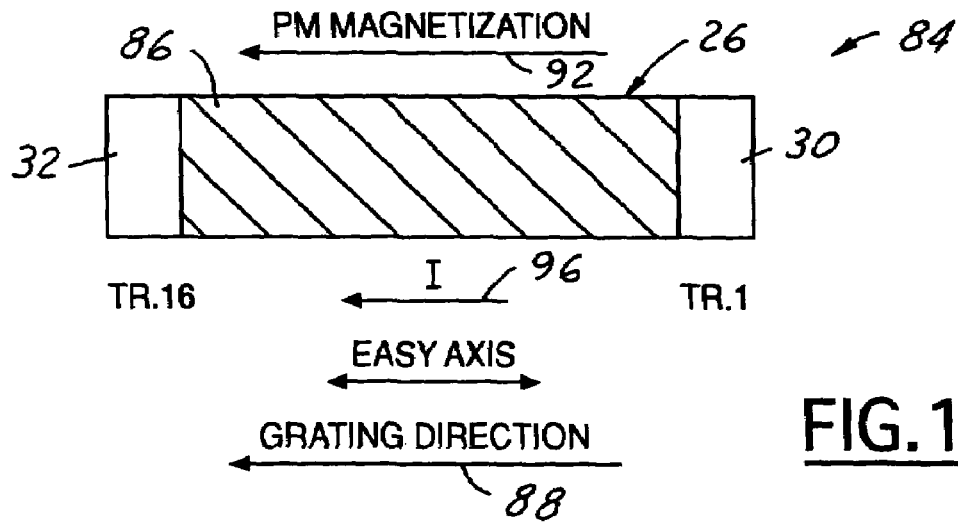
FIG. 10 illustrates a block diagram of a MR read element of the read forward module of the assembled head shown in FIG. 8 along a view with the MR layer on top and the SAL on bottom.

Referring now to FIGS. 9 and 10, the biasing of the MR read elements of read backward and forward modules 82 and 84 in accordance with the second embodiment of the present invention will now be described. FIG. 9 illustrates a block diagram of a MR read element 18 of read backward module 82 along a view with the MR layer on top and the SAL on bottom. FIG. 10 illustrates a block diagram of a MR read element 26 of read forward module 84 along a view with the MR layer on top and the SAL on bottom. As shown in FIG. 10, read forward module 84 has not yet been flipped over with respect to read backward module 82 for assembly into head 80.

As grating 86 has a common periodic structure orientation, the orientation of the grating for MR read elements 18 and 26 is directed along second grating direction 88 as shown in FIGS. 9 and 10. Read backward and forward modules 82 and 84 are assembled into head 80 such that the corresponding MR read elements 18 and 26 oppose one another. The permanent magnets are then magnetically set at the head level.

For instance, in read backward module 82, permanent magnets 22 and 24 of MR read elements 18 are set in a PM magnetization direction 90 opposite to the orientation of grating 86 as shown in FIG. 9, i.e., PM magnetization direction 90 is opposite to second grating direction 88. In read forward module 84, permanent magnets 30 and 32 of MR read elements 26 are set in a PM magnetization direction 92 same as the orientation of grating as shown in FIG. 10, i.e., PM magnetization direction 92 is set in the same direction as second grating direction 88.

The bias current (I) for each of the MR read elements of read backward and forward modules 82 and 84 is then set in the direction that results in magnetically stable MR read element operation, that is, in the same direction as the respective PM magnetization directions 90 and 92 in this embodiment. For example, the bias current (I) for MR read elements 18 of read backward module 82 is set in a bias current direction 94 same as PM magnetization direction 90 as shown in FIG. 9, i.e., bias current direction 94 is opposite to second grating direction 88. The bias current (I) for MR read elements 26 of read forward module 84 is set in a bias current direction 96 the same as PM magnetization direction 92 as shown in FIG. 10, i.e., bias current direction 96 is the same as second grating direction 88. That is, the bias current (I) is opposite for read backward and forward modules 82 and 84. By biasing the MR read elements in this opposing current fashion, a single grating wafer design for opposing MR read elements in an assembled head is feasible.

Figure 11:
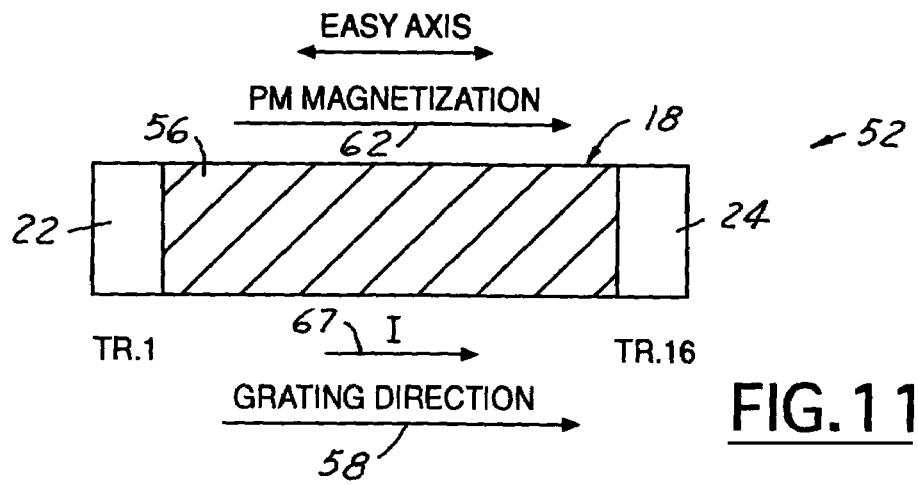
FIG. 11 illustrates a block diagram of a MR read element of a read backward module of an assembled head in accordance with a third embodiment of the present invention.
Figure 12:
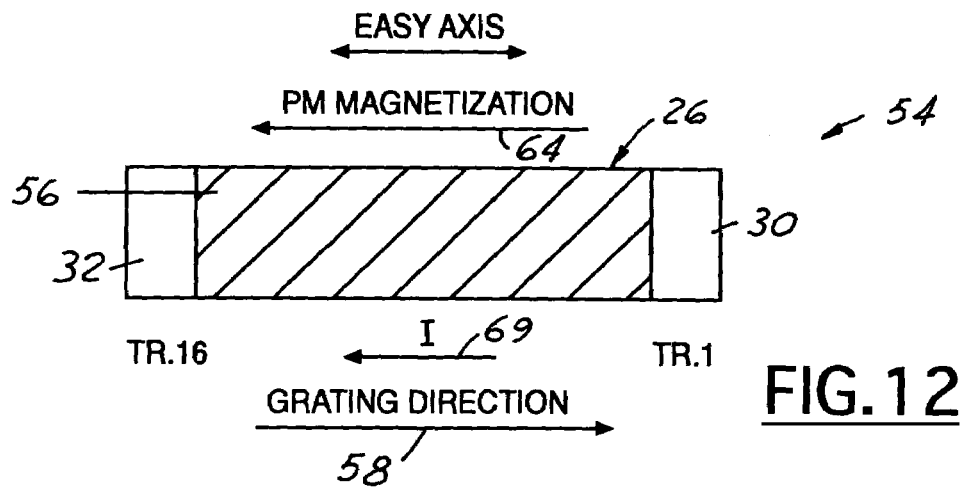
FIG. 12 illustrates a block diagram of a MR read element of a read forward module of the assembled head in accordance with the third embodiment of the present invention.

Referring now to FIGS. 11 and 12, the biasing of the MR read elements of read backward and forward modules 52 and 54 in accordance with a third embodiment of the present invention will now be described. FIG. 11 illustrates a block diagram of a MR read element 18 of read backward module 52 along a view with the SAL on top and the MR layer on bottom. (In contrast, FIG. 6 illustrates a view with the MR layer on top and the SAL on bottom.) FIG. 12 illustrates a block diagram of a MR read element 26 of read forward module 54 along a view with the SAL on top and the MR layer on bottom. (In contrast, FIG. 7 illustrates a view with the MR layer on top and the SAL on bottom.) As shown in FIG. 12, read forward module 54 has not yet been flipped over with respect to read backward module 52 for assembly into head 50. That is, FIG. 12 illustrates read forward module 54 prior to it being flipped over.

As grating 56 has a common periodic structure orientation, the orientation of the grating for MR read elements 18 and 26 is directed along first grating direction 58 as shown in FIGS. 11 and 12. Read backward and forward modules 52 and 54 are assembled into head 50 such that the corresponding MR read elements 18 and 26 oppose one another. The permanent magnets are then magnetically set at the head level.

For instance, in read backward module 52, permanent magnets 22 and 24 of MR read elements 18 are set in a PM magnetization direction 62 the same as the orientation of grating 56 as shown in FIG. 6, i.e., PM magnetization direction 62 is the same as first grating direction 58. In read forward module 54, permanent magnets 30 and 32 of MR read elements 26 are set in a PM magnetization direction 64 opposite to the orientation of grating as shown in FIG. 7, i.e., PM magnetization direction 64 is opposite to first grating direction 58.

The bias current (I) for each of the MR read elements of read backward and forward modules 52 and 54 is then set in the direction that results in magnetically stable MR read element operation, that is, in the same direction as the respective PM magnetization directions 62 and 64 in this embodiment. For example, the bias current (I) for MR read elements 18 of read backward module 52 is set in a bias current direction 67 which is the same as PM magnetization direction 62 as shown in FIG. 11, i.e., bias current direction 67 is in the same direction as first grating direction 58. The bias current (I) for MR read elements 26 of read forward module 54 is set in a bias current direction 69 which is the same as PM magnetization direction 64 as shown in FIG. 12, i.e., bias current direction 69 is opposite first grating direction 58.

In effect, the bias current (I) is opposite for read backward and forward modules 52 and 54 because the PM magnetization is opposite for the unassembled read backward and forward modules when the PM setting is done at the assembled module head level. By biasing the MR read elements in this opposing current fashion, a single grating wafer design for opposing MR read elements in an assembled head is feasible.

Figure 13:
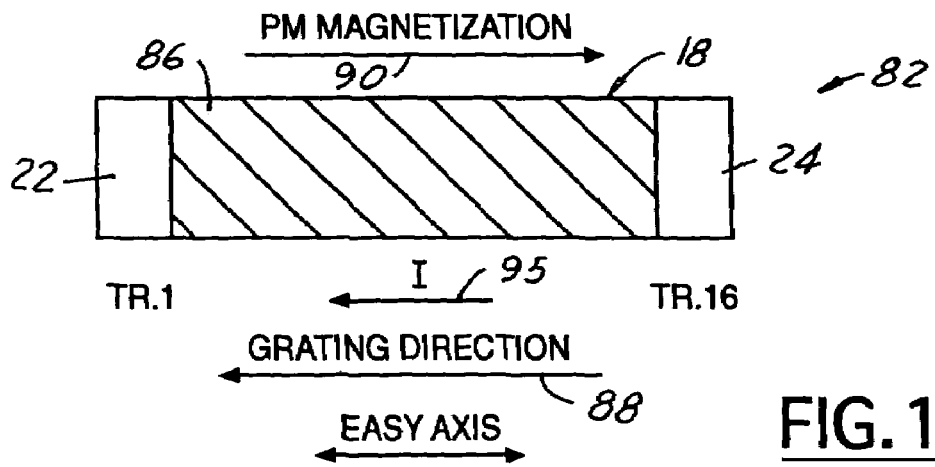
FIG. 13 illustrates a block diagram of a MR read element of a read backward module of an assembled head in accordance with a fourth embodiment of the present invention.
Figure 14:
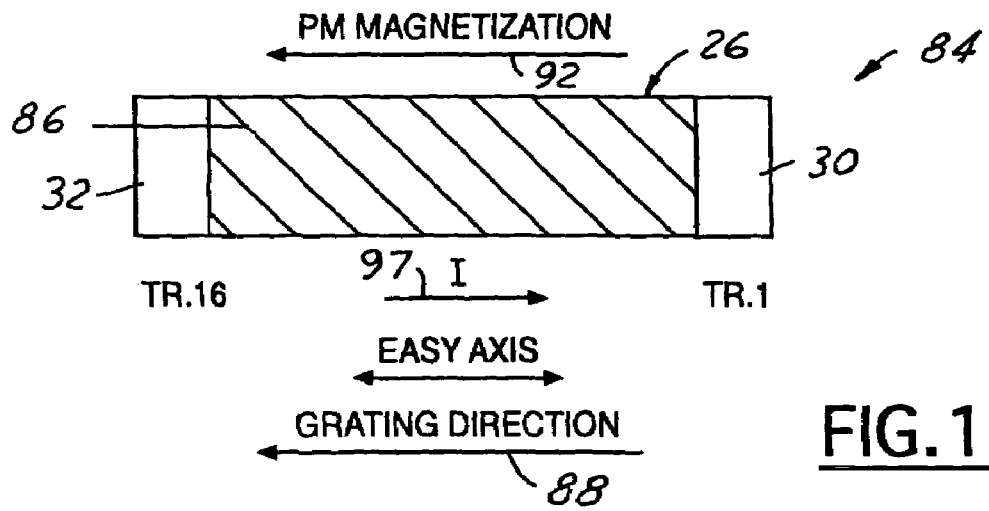
FIG. 14 illustrates a block diagram of a MR read element of a read forward module of the assembled head in accordance with the fourth embodiment of the present invention.

Referring now to FIGS. 13 and 14, the biasing of the MR read elements of read backward and forward modules 82 and 84 in accordance with a fourth embodiment of the present invention will now be described. FIG. 13 illustrates a block diagram of a MR read element 18 of read backward module 82 along a view with the SAL on top and the MR layer on bottom. (In contrast, FIG. 9 illustrates a view with the MR layer on top and the SAL on bottom.) FIG. 14 illustrates a block diagram of a MR read element 26 of read forward module 84 along a view with the SAL on top and the MR layer on bottom. (In contrast, FIG. 10 illustrates a view with the MR layer on top and the SAL on bottom.) As shown in FIG. 14, read forward module 84 has not yet been flipped over with respect to read backward module 82 for assembly into head 80. That is, FIG. 14 illustrates read forward module 54 prior to it being flipped over.

As grating 86 has a common periodic structure orientation, the orientation of the grating for MR read elements 18 and 26 is directed along second grating direction 88 as shown in FIGS. 13 and 14. Read backward and forward modules 82 and 84 are assembled into head 80 such that the corresponding MR read elements 18 and 26 oppose one another. The permanent magnets are then magnetically set at the head level.

For instance, in read backward module 82, permanent magnets 22 and 24 of MR read elements 18 are set in a PM magnetization direction 90 opposite to the orientation of grating 86 as shown in FIG. 13, i.e., PM magnetization direction 90 is opposite to second grating direction 88. In read forward module 84, permanent magnets 30 and 32 of MR read elements 26 are set in a PM magnetization direction 92 same as the orientation of grating as shown in FIG. 14, i.e., PM magnetization direction 92 is the same as second grating direction 88.

The bias current (I) for each of the MR read elements of read backward and forward modules 82 and 84 is then set in the direction that results in magnetically stable MR read element operation, that is, in opposite directions than the respective PM magnetization directions 90 and 92 in this embodiment. For example, the bias current (I) for MR read elements 18 of read backward module 82 is set in a bias current direction 95 which is opposite to PM magnetization direction 90 as shown in FIG. 13, i.e., bias current direction 95 is in the same direction as second grating direction 88. The bias current (I) for MR read elements 26 of read forward module 84 is set in a bias current direction 97 which is opposite to PM magnetization direction 92 as shown in FIG. 14, i.e., bias current direction 97 is opposite second grating direction 88.

In effect, the bias current (I) is opposite for read backward and forward modules 82 and 84 because the PM magnetization is opposite for the unassembled read backward and forward modules when the PM setting is done at the assembled module head level. By biasing the MR read elements in this opposing current fashion, a single grating wafer design for opposing MR read elements in an assembled head is feasible.

While embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the present invention.

What is claimed is:

1. A magnetic head comprising:
   a wafer having a grating directed along a first direction;
   a first module having a magneto-resistive (MR) element formed on a first portion of the wafer, the MR element of the first module having magnetic end regions, wherein magnetization of the magnetic end regions of the MR element of the first module is directed along a second direction opposite to the first direction, wherein the MR element of the first module is biased with a first bias current directed along a direction that is parallel or anti-parallel to the second direction such that desired magnetically stable operation of the MR element of the first module is obtained with one or the other or both of the directions; and
   a second module having a MR element formed on a second portion of the wafer, the MR element of the second module having magnetic end regions, wherein magnetization of the magnetic end regions of the MR element of the second module is directed along the first direction, wherein the MR element of the second module is biased with a second bias current directed along a direction that is the opposite of the first bias current direction in the first module.

2. The head of claim 1 wherein:
   one of the first and second modules is flipped over with respect to the other one of the first and second modules such that the direction of the grating of the wafer portion of the flipped over module is reversed with respect to the first direction.

3. The head of claim 1 wherein:
   the first module is a read backward module, and the second module is a read forward module.

4. The head of claim 1 further comprising:
   a write module disposed between the first and second modules.

5. The head of claim 1 wherein:
   the first module is a read forward module, and the second module is a read backward module.

6. The head of claim 1 wherein:
   the MR element of the first module includes a plurality of MR elements, and the MR element of the second module includes a plurality of MR elements, wherein one of the first and second modules is flipped over with respect to the other one of the first and second modules such that MR elements of the first module oppose corresponding MR elements of the second module.

7. A magnetic head comprising:
   a first module having a magneto-resistive (MR) element formed on a wafer having a grating directed along a first direction, the MR element of the first module having magnetic end regions, wherein magnetization of the magnetic end regions of the MR element of the first module is directed along a second direction opposite to the first direction, wherein the MR element of the first module is biased with a first bias current directed along a direction that is parallel or anti-parallel to the second direction such that desired magnetically stable operation of the MR element of the first module is obtained with one or the other or both of the directions; and
   a second module having a MR element formed on a wafer having a grating directed along the first direction, the MR element of the second module having magnetic end regions, wherein magnetization of the magnetic end regions of the MR element of the second module is directed along the first direction, wherein the MR element of the second module is biased with a second bias current directed along a direction that is the opposite 8. The head of claim 7 wherein:
   one of the first and second modules is flipped over with respect to the other one of the first and second modules such that the direction of the grating of the wafer of the flipped over module is reversed with respect to the first direction.

9. The head of claim 7 wherein:
   the first module is a read backward module, and the second module is a read forward module.

10. The head of claim 7 further comprising:
    a write module disposed between the first and second modules.

11. The head of claim 7 wherein:
    the first module is a read forward module, and the second module is a read backward module.

12. The head of claim 7 wherein:
    the MR element of the first module includes a plurality of MR elements, and the MR element of the second module includes a plurality of MR elements, wherein one of the first and second modules is flipped over with respect to the other one of the first and second modules such that MR elements of the first module oppose corresponding MR elements of the second module.

* * * * *